(12) United States Patent
Chiu (10) Patent No.: US 12,547,779 B2
(45) Date of Patent: Feb. 10, 2026

(54) MICROCONTROLLER, ELECTRONIC DEVICE, AND METHOD FOR ENCRYPTING TRANSMISSION DATA USING THE SAME

(71) Applicant: NUVOTON TECHNOLOGY CORPORATION, Hsinchu (TW)

(72) Inventor: Kuan-Lun Chiu, Zhubei (TW)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 228 days.

(21) Appl. No.: 18/432,925

(22) Filed: Feb. 5, 2024

(65) Prior Publication Data

US 2024/0273240 A1    Aug. 15, 2024

(30) Foreign Application Priority Data

Feb. 10, 2023   (TW) .................................. 112104785

(51) Int. Cl.
*G06F 21/72*   (2013.01)
(52) U.S. Cl.
CPC .................................. *G06F 21/72* (2013.01)
(58) Field of Classification Search
CPC ....... G06F 21/72; G06F 12/1408; G06F 21/78
See application file for complete search history.

(56) References Cited

U.S. PATENT DOCUMENTS

| | | | | |
|---|---|---|---|---|
| 8,000,467 | B2* | 8/2011 | Elbaz | H04L 9/065 380/37 |
| 9,600,412 | B1* | 3/2017 | Aingaran | G06F 12/10 |
| 2012/0059871 | A1* | 3/2012 | Jahn | G06F 16/80 711/206 |
| 2019/0179772 | A1* | 6/2019 | Ilani | G06F 12/1408 |
| 2025/0190372 | A1* | 6/2025 | Dodds | G06F 9/30029 |

* cited by examiner

*Primary Examiner* — Lizbeth Torres-Diaz
(74) *Attorney, Agent, or Firm* — MUNCY, GEISSLER, OLDS & LOWE, P.C.

(57) ABSTRACT

A microcontroller, an electronic device, and a method for encrypting transmission data using the same are provided. The microcontroller includes a processing circuit, a storage circuit, and a data scrambling circuit. The processing circuit is arranged to access a raw data to control the operation of the microcontroller. The storage circuit is coupled to the processing circuit and configured to store a characteristic parameter of the microcontroller. The data scrambling circuit is coupled to the storage circuit and the processing circuit, and arranged to generate a transformation matrix according to at least one of the characteristic parameters and a random-number value. When the microcontroller sends data, the data scrambling circuit swaps the bit addresses of a plurality of data units in the raw data, to convert the raw data into a scramble data.

13 Claims, 7 Drawing Sheets

MICROCONTROLLER, ELECTRONIC DEVICE, AND METHOD FOR ENCRYPTING TRANSMISSION DATA USING THE SAME

BACKGROUND

1. Field of the Invention

The present invention relates to a data transmission technology, and more particularly, to a microcontroller, an electronic device using the microcontroller, and a transmission data encryption method.

2. Description of the Related Art

In order to protect an external storage device from being maliciously monitored, or protect the firmware program data thereof from being stolen via using a burner to directly copy the content of the storage device, the data stored in the storage device external to the microcontroller generally needs to go through a certain extent of encryption, to avoid the above-mentioned malicious data invasion.

However, as far as the current encryption protection methods are concerned, a common problem is that once the encryption algorithm is cracked, all devices using this encryption algorithm to transmit data will have to bear security risks.

SUMMARY

The present disclosure provides a microcontroller, an electronic device using the microcontroller, and a transmission data encryption method, which can reduce the possibility of the firmware information of the microcontroller being stolen.

The present disclosure provides a microcontroller which includes a processing circuit, a storage circuit, and a data scrambling circuit. The processing circuit is arranged to access a primitive data to control operations of the microcontroller. The storage circuit is coupled to the processing circuit, and arranged to store a characteristic parameter of the microcontroller. The data scrambling circuit is coupled to the storage circuit and the processing circuit, and arranged to generate a transformation matrix according to at least one of the characteristic parameters and a random-number value. When the microcontroller sends data, the data scrambling circuit performs address exchanging upon a plurality of data units in the primitive data based on the transformation matrix, to generate a scrambled data.

The present disclosure provides an electronic device, which includes a nonvolatile memory and a microcontroller. The microcontroller is electrically connected with the nonvolatile memory and used for writing the scrambled data into or reading the scrambled data from the non-volatile memory. The controller comprises a processing circuit, a storage circuit, and a data scrambling circuit. The processing circuit is used to access the raw data to control the operation of the microcontroller. The storage circuit is coupled to the processing circuit for storing the characteristic parameters of the microcontroller. The data scrambling circuit is coupled to the storage circuit and the processing circuit, to generate a transformation matrix according to at least one of the characteristic parameters and the random-number values. When the microcontroller sends the scrambled data to the nonvolatile memory, the data scrambling circuit performs address exchanging upon a plurality of data units in the primitive data based on the transformation matrix, to generate the scrambled data. When the microcontroller receives the scrambled data from the nonvolatile memory, the data scrambling circuit performs reverse address exchanging upon a plurality of data units in the scrambled data based on the transformation matrix, to convert the scrambled data into the primitive data.

The disclosure provides a transmission data encryption method for a microcontroller, which comprises the following steps: generating a transformation matrix according to a characteristic parameter and a random-number value of the microcontroller; when sending data, the microcontroller performing address exchanging upon a plurality of data units in an primitive data based on the transformation matrix, to generate and send a scrambled data; and when receiving data, the microcontroller performing reverse address exchanging upon a plurality of data units in the received external data based on the transformation matrix, to convert the external data into the primitive data.

Based on the above, the microcontroller, the electronic device and the transmission data encryption method using the microcontroller may generate a transformation matrix by using the dedicated parameter information of individual microcontrollers to encrypt the primitive data, so that even if the data sent to the outside by the microcontroller is intercepted, the firmware information of the microcontroller cannot be acquired, thereby avoiding the possibility that others steal the firmware information by monitoring the bus signal or forcibly removing the nonvolatile memory and then using a specific reading device. In addition, since the transformation matrix is generated based on the dedicated characteristic parameters of the microcontroller, each microcontroller will have its own dedicated transformation matrix. In this way, even if the transformation matrix of a single microcontroller is cracked, the cracked information cannot be easily leaked or applied to other microcontroller products. Compared with conventional methods of which the information protection ability is nullified once the data encryption algorithm is cracked, the present invention can provide better information security.

BRIEF DESCRIPTION OF THE DRAWINGS

In order to allow the abovementioned and other purposes, features, advantages and embodiments of the present disclosure to be more clearly understood, the accompanying drawings are described as following.

DESCRIPTION OF THE PREFERRED EMBODIMENTS

This disclosure proposes a new microcontroller, an electronic device using the same and a transmission data encryption method to solve the problems mentioned in the background art. In order to make the features and advantages of the present disclosure more obvious and easier to understand, specific embodiments of the present invention will be described in detail with reference to the accompanying drawings. The following description contains specific information related to exemplary embodiments in this disclosure. The drawings in this disclosure and the accompanying detailed description are only exemplary embodiments. However, the present disclosure is not limited to these exemplary embodiments. Other variations and embodiments of the present disclosure will occur to those skilled in the art. Unless otherwise specified, the same or corresponding elements in the drawings may be indicated by the same or corresponding reference numerals. Furthermore, the drawings and illustrations in this disclosure are generally not drawn to scale and are not intended to correspond to actual relative dimensions.

Figure 1:
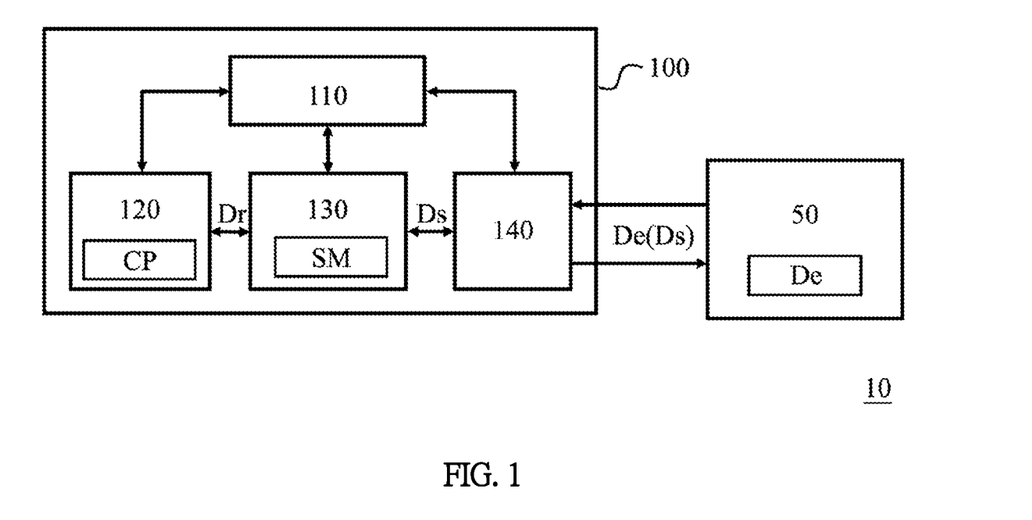
FIG. 1 is a diagram illustrating an electronic device and its microcontroller according to an embodiment of the present disclosure.

FIG. 1 is a diagram illustrating an electronic device and its microcontroller according to an embodiment of the present disclosure. Referring to FIG. 1, the electronic device 10 of this embodiment includes a nonvolatile memory 50, and a microcontroller 100 electrically connected to the nonvolatile memory 50. The electronic device 10 may be implemented as a smart phone, a wearable device, a tablet computer or a personal computer, and the disclosure is not limited thereto.

The nonvolatile memory 50 may be a flash memory (e.g., a NAND flash memory or NOR flash memory) or an electrically erasable programmable read-only memory (EPROM) that uses dedicated addresses and instructions to accesses data.

Generally, the microcontroller 100 can write data into or read data from the nonvolatile memory 50 through a bus, and the microcontroller 100 includes a processing circuit 110, a storage circuit 120, and a data scrambling circuit 130.

The processing circuit 110 is may be a central processing unit (CPU) for accessing the primitive data Dr to control the operations of the microcontroller 100.

The storage circuit 120 is coupled to the processing circuit 110 and is used to store the characteristic parameter CP of the microcontroller 100. The storage circuit 120 may be implemented as an APROM, SRAM, LDROM, etc., and the present disclosure is not limited thereto.

In some embodiments, the characteristic parameter CP may be a fixed parameter that is set when leaving the factory and dedicated to the microcontroller 100, such as a unique identification code (UID) or a physical address of the microcontroller 100.

In some embodiments, the characteristic parameter CP may also be randomly generated by capturing the operating parameters of the microcontroller 100 powered on for the first time. For example, when the processing circuit 110 is powered on for the first time, the characteristic parameter CP can be generated by storing the initial data in the circuit.

No matter the characteristic parameter CP is generated via which of the above methods, it belongs to an individual microcontroller 100, meaning, different microcontrollers 100 do not have the same characteristic parameter CP.

The data scrambling circuit 130 is coupled to the storage circuit 120 and the processing circuit 110, and is used for generating the transformation matrix SM according to at least one of the characteristic parameter CP and the random-number value. The transformation matrix SM is used as a reference for conversion between the primitive data Dr for internal accesses of the microcontroller 100 and the scrambled data Ds sent to the outside.

The random-number value may be a value randomly generated in the data scrambling circuit 130, or a random signal extracted or provided from other components in the microcontroller 100, and the present disclosure is not limited thereto.

In some embodiments, the microcontroller 100 further includes a transmission interface circuit 140. The transmission interface circuit 140 is coupled to the data scrambling circuit 130, and is used to receive the generated scrambled data Ds from the data scrambling circuit 130 and send the scrambled data Ds to the outside of the microcontroller 100. In another example, the transmission interface circuit 140 may receive the external data De provided to the microcontroller 100, and transmit the received external data De to the data scrambling circuit 130 for restoration. When the received external data De is scrambled data Ds conforming to the conversion format, the data scrambling circuit 130 will refer to the transformation matrix SM to convert the external data De into the primitive data Dr which is accessible by the processing circuit 110.

In addition, although not specifically mentioned in this embodiment, the microcontroller 100 may further include other functional modules, such as a bus controller, PDMA controller, etc., but this disclosure is not limited thereto.

Specifically, when the microcontroller 100 writes data into the nonvolatile memory 50, the primitive data Dr to be outputted will be transmitted to the data scrambling circuit 130, so that the data scrambling circuit 130 exchanges addresses of data units in the primitive data Dr based on the transformation matrix SM, thereby generating scrambled data Ds for external transmission. The converted scrambled data Ds will be sent to the outside of the microcontroller 100 for transmission as external data De between the microcontroller 100 and the nonvolatile memory 50, where the nonvolatile memory 50 stores the external data De/scrambled data Ds after receiving it.

On the contrary, when the microcontroller 100 reads data from the nonvolatile memory 50, the received external data De will be transmitted to the data scrambling circuit 130 for restoration. Meanwhile, the data scrambling circuit 130 performs reverse address exchanging upon the data units in the external data De based on the transformation matrix SM. If the format of the external data De conforms to the format of the scrambled data Ds, the received external data De can be converted/restored to the primitive data Dr accessible by the processing circuit 110.

Note that the data format of the primitive data Dr may be the data that can be accessed by the processing circuit 110 and used as a basis for control. The scrambled data Ds may be the data generated by processing the primitive data Dr processed by the data scrambling circuit 130. The external data De may be the data transmitted outside the microcontroller 100, and if its format conforms to that of the scrambled data Ds, the external data De can be regarded as the scrambled data Ds.

Figure 2A:
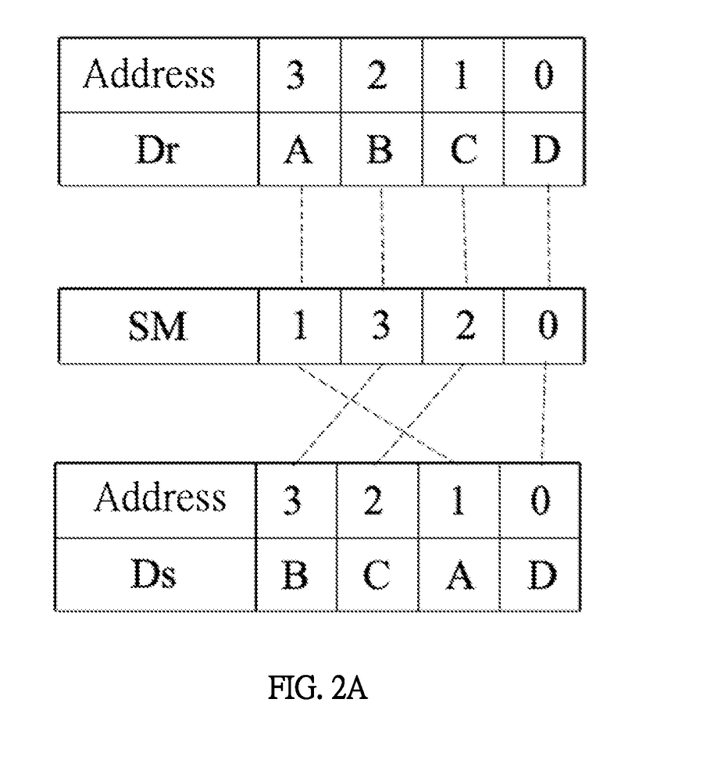
FIGS. 2A and 2B are diagrams illustrating address exchanging of primitive data based on a transformation matrix according to different embodiments of the present disclosure.
Figure 2B:
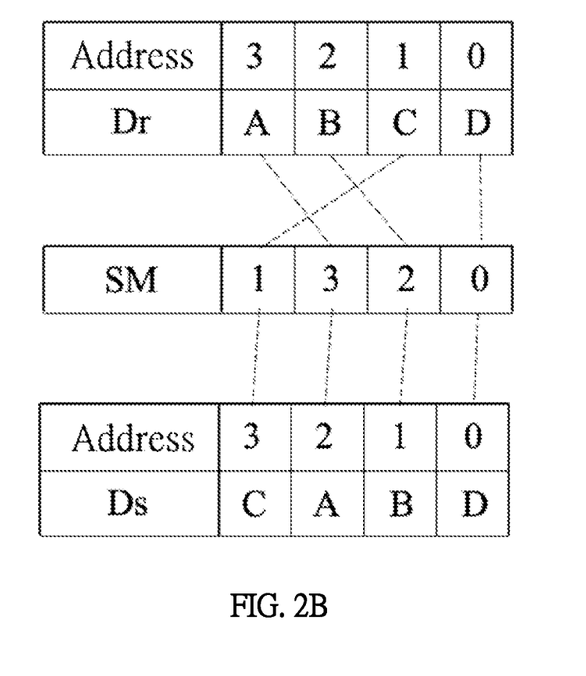

Next, the address exchanging method between the primitive data and the scrambled data is described in more detail with the examples of FIG. 2A and FIG. 2B, which are diagrams illustrating address exchanging of primitive data based on a transformation matrix according to different embodiments of the present disclosure.

Please refer to FIG. 2A. The primitive data Dr in this embodiment is illustrated as four data units (A, B, C, D), wherein the addresses of the data units (A, B, C, D) are (3, 2, 1, 0), respectively. In addition, the transformation matrix SM generated by the data scrambling circuit 130 includes four elements (1, 3, 2, 0) corresponding to the data units (A, B, C, D) respectively, wherein the values of the four elements are respectively generated according to at least one of a characteristic parameter and a random-number value. The way of generating the transformation matrix SM is further explained in the following embodiments.

In this embodiment, when the data scrambling circuit 130 performs address exchanging upon the primitive data Dr, the data scrambling circuit 130 will allocate a designated address to each of the data units (A, B, C, D) according to the corresponding element (1, 3, 2, 0) to generate scrambled data.

For example, the data scrambling circuit 130 may perform following operations: allocating the data unit A at Address 3 to Address 1 according to the corresponding element value 1; allocating the data unit B at Address 2 to Address 3 according to the corresponding element value 3; allocating the data unit C at Address 1 to Address 2 according to the corresponding element value 2; and allocate the data unit D at Address 0 to Address 0 according to the corresponding element value 0. Therefore, after the above address exchanging, a new scrambled data Ds will be generated, which includes the data units (B, C, A, D). In other words, the elements (1, 3, 2, 0) in this embodiment respectively represent designated addresses in the scrambled data Ds.

On the other hand, when the data scrambling circuit 130 restores the received scrambled data Ds to the primitive data Dr, the data scrambling circuit 130 will perform reverse address exchanging upon the data units (B, C, A, D) of the scrambled data Ds.

In this embodiment, when the data scrambling circuit 130 performs reverse address exchanging, the data units (B, C, A, D) in the scrambled data Ds with the addresses corresponding to the elements (1, 3, 2, 0) of the transformation matrix SM are allocated according to the order of address, to generate the primitive data Dr.

For example, the element value 3 corresponding to Address 3 of the scrambled data Ds is corresponding to Address 2 of the primitive data Dr, and the data scrambling circuit 130 may perform following operations: allocating the data unit B at Address 3 to Address 2; allocating the element value 2 corresponding to Address 2 of the scrambled data Ds to Address 1 of the primitive data Dr, so that the data scrambling circuit 130 may allocate the data unit C at Address 2 to Address 1; allocating the element value 1 corresponding to Address 1 of the scrambled data Ds to Address 3 of the primitive data Dr, so the data scrambling circuit 130 may allocate the data unit A at Address 1 to Address 3; and allocating the element value 0 corresponding to Address 0 of the scrambled data Ds to Address 0 of the primitive data Dr, so that the data scrambling circuit 130 may allocate the data unit D at Address 0 to Address 0. Therefore, after the above reverse address exchanging, the scrambled data (B, C, A, D) will be restored to (A, B, C, D).

Please refer to FIG. 2B. The embodiment of FIG. 2B shows another way of address exchanging. In this embodiment, when the data scrambling circuit 130 allocates each data unit (A, B, C, D) to a designated address according to the corresponding element (1, 3, 2, 0), it allocates the data unit A at Address 3 to Address 2 corresponding to the element value 3. Similarly, the data unit B at Address 2 will be allocated to Address 1 corresponding to element value 2. Other data units C and D can be operated using the same ideology, and the details are not repeated here. Through the address exchanging method in this embodiment, the data scrambling circuit 130 can generate the scrambled data Ds(C, A, B, D) based on the primitive data Dr(A, B, C, D).

On the other hand, when the data scrambling circuit 130 performs reverse address exchanging upon the data units (C, A, B, D) scrambled by the data, the data scrambling circuit 130 may sequentially allocate the data units (C, A, B, D) to the addresses designated by the elements (1, 3, 2, 0) to generate the primitive data Dr. In other words, the elements (1, 3, 2, 0) in this embodiment respectively represent the designated addresses in the primitive data Dr.

For example, the data scrambling circuit 130 may allocate the data unit C at Address 3 to Address 1 specified by the corresponding element 1. Similarly, the data scrambling circuit 130 may allocate the data unit A at Address 2 to Address 3 specified by the corresponding element 3. Other data units B and D can be scrambled using the same ideology, and the details are not repeated here. Through the reverse address exchanging in this embodiment, the scrambled data Ds(C, A, B, D) will be restored to the primitive data Dr(A, B, C, D).

It should be noted here that the data unit can be either a bit or a byte. In other words, the data scrambling circuit 130 can exchange addresses in bit-by-bit manner or on a byte-by-byte byte basis, but the present disclosure is not limited thereto. When different data units are selected, the number of elements of the generated transformation matrix SM will be also different.

In other words, the embodiment of FIG. 2A is similar to that of FIG. 2B, and the only difference is that address exchanging mode of FIG. 2A is the same as the reverse address exchanging mode of FIG. 2B, and the reverse address exchanging mode of FIG. 2A is the same as the address exchanging mode of FIG. 2B.

Because the primitive data Dr only contains meaningful and identifiable codes and programs, even if the scrambled data Ds transmitted outside the microcontroller 100 is intercepted, the firmware information of the microcontroller 100 cannot be obtained. Therefore, the scrambled data Ds after the conversion of the above embodiment can effectively reduce the possibility of the firmware information being stolen via monitoring the bus signals or via forcibly removing the nonvolatile memory 50 and then using a specific reading device.

In addition, in this embodiment, the transformation matrix SM used to generate the scrambled data Ds is generated based on the dedicated characteristic parameters (or characteristic parameters with random-number values) of the microcontroller 100, so that each microcontroller 100 will have its own dedicated transformation matrix SM. In this way, even if the transformation matrix SM of an individual microcontroller 100 is cracked, the cracked information cannot be easily leaked nor applied to other microcontroller products. Compared with conventional data encryption algorithms which lose the information protection ability once the algorithm is cracked, the present invention does provide better information security.

Figure 3:
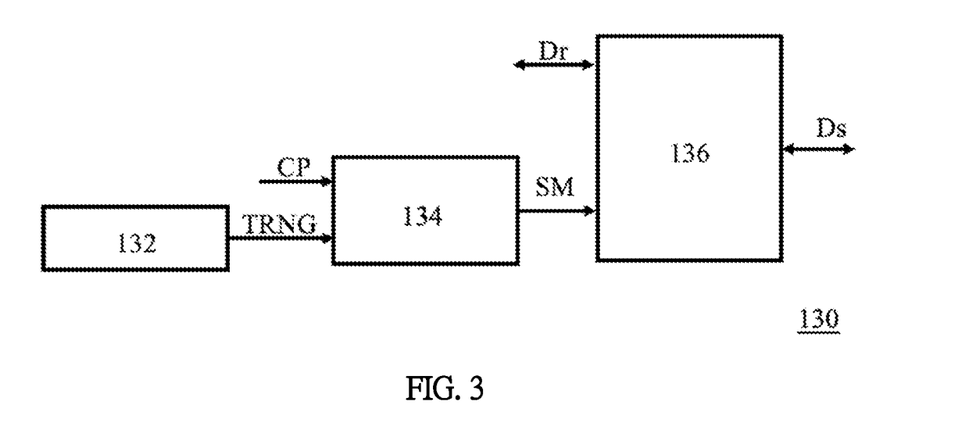
FIG. 3 is a diagram illustrating a data scrambling circuit according to the embodiment of FIG. 1.

FIG. 3 is a diagram illustrating a data scrambling circuit according to the embodiment of FIG. 1. Referring to FIG. 3, the data scrambling circuit 130 of this embodiment includes a random-number generator 132, a transformation matrix generation unit 134 and a data transformation unit 136.

The random-number generator 132 is used to generate a random-number value TRNG. The transformation matrix generating unit 134 is coupled to the random-number generator 132, and is used for generating the transformation matrix SM according to the random-number value TRNG and the characteristic parameter CP, wherein the number of elements of the transformation matrix SM is corresponding to the number of the data units of the primitive data Dr. For example, if "bit" is used as the data unit, each bit is corresponding to one element. In this way, if the primitive data Dr is 16-bit data, the generated transformation matrix SM will include 16 elements, so that each bit of the primitive data Dr can be exchanged with reference to the corresponding element. If "byte" is used as the data unit, each byte will correspond to 2 elements. Therefore, if the primitive data Dr is 32-bit data, the generated transformation matrix SM will include 4 elements, so that each byte of the primitive data Dr can be exchanged with reference to the corresponding elements. The present disclosure, however, is not limited the above. The data conversion unit 136 is coupled to the transformation matrix generation unit 134, and is used for performing address exchanging upon the primitive data Dr according to the transformation matrix SM, thereby generating the scrambled data Ds, or restoring the scrambled data Ds to the primitive data Dr according to the transformation matrix SM.

By using the characteristic parameter CP with the random-number value TRNG to generate the transformation matrix SM, the randomness of the transformation matrix SM can be increased, the encryption strength can be improved, and the risk that the transformation matrix SM can be easily cracked due to the leakage of the characteristic parameter CP can be prevented.

Figure 4:
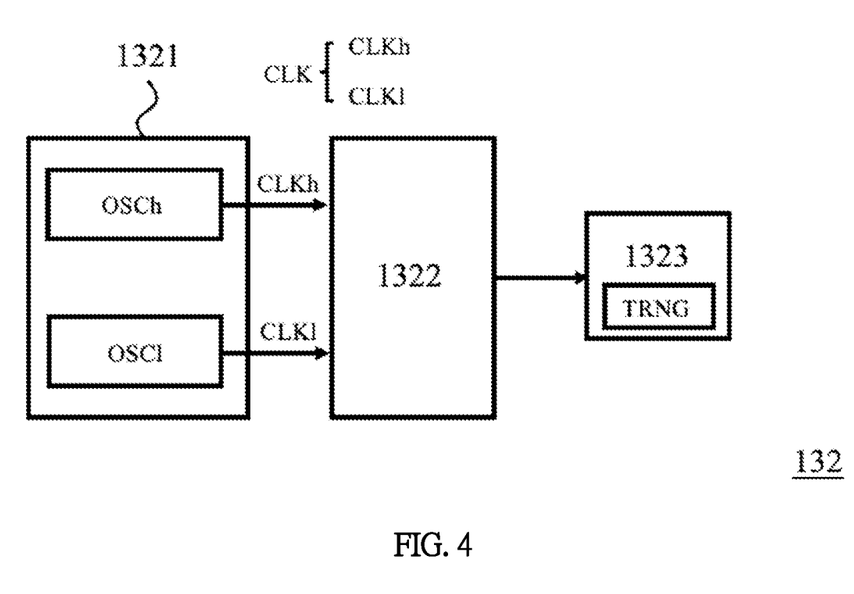
FIG. 4 is a diagram illustrating a random-number generator according to the embodiment of FIG. 3.

FIG. 4 is a diagram illustrating a random-number generator according to the embodiment of FIG. 3. Referring to FIG. 4, the random-number generator 132 of this embodiment includes, for example, an oscillation circuit 1321, a random sampling circuit 1322 and a register 1323.

The oscillation circuit 1321 is used to generate the clock signal CLK. The random sampling circuit 1322 is electrically connected to the oscillation circuit 1321, and is used for randomly sampling the clock signal CLK to generate a random sampling signal. The register 1323 is electrically connected to the random sampling circuit 1322, and is used to store the random sampling signal as a random-number value TRNG.

In some embodiments, the oscillation circuit 1321 may include a high-frequency oscillation circuit OSCh and a low-frequency oscillation circuit OSCl, wherein the random sampling circuit 1322 may perform random sampling based on the high-frequency clock signal CLKh and the low-frequency clock signal CLK1, thereby improving the randomness of the randomly sampled signal.

Figure 5A:
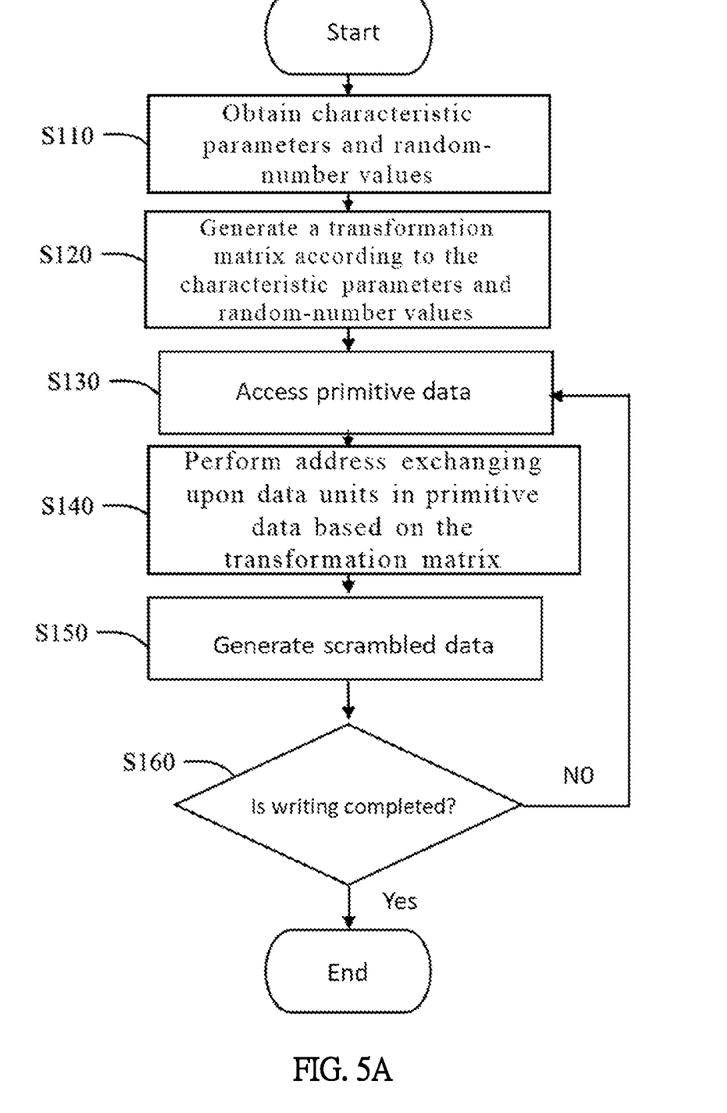
FIGS. 5A and 5B are flowcharts illustrating the steps of the transmission data encryption method for the microcontroller according to different embodiments of the present disclosure.
Figure 5B:
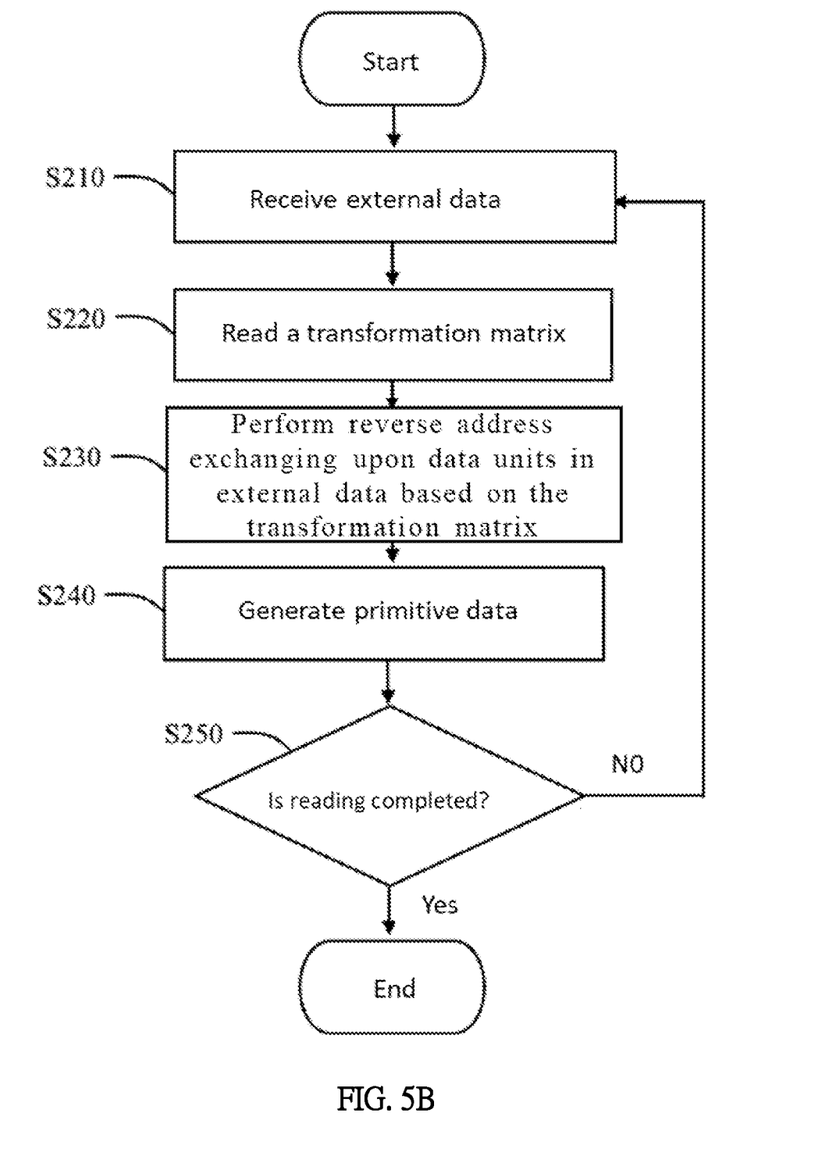

FIGS. 5A and 5B are flowcharts illustrating the steps of the transmission data encryption method for the microcontroller according to different embodiments of the present disclosure, wherein FIG. 5A is a flowchart showing the steps of the microcontroller writing data to the external nonvolatile memory, and FIG. 5B is a flowchart showing the steps of the microcontroller reading data from the external nonvolatile memory.

Please refer to FIG. 5A. The transmission data encryption method of this embodiment can be applied to the above-mentioned microcontroller architecture of FIGS. 1 to 4. First, after a microcontroller (e.g., the microcontroller 100) is powered on, the data scrambling circuit (e.g., 130) will obtain the characteristic parameters and random-number values of the microcontroller (Step S110), and then generate a transformation matrix according to the characteristic parameters and random-number values (Step S120). In some embodiments, the steps S110 and S120 are only performed for the first-time powering on. That is to say, the transformation matrix will be generated and determined at the first-time powering on. In the subsequent processes, the transformation matrix generated at the first time powering on will be referenced, and the transformation matrix will not be updated or regenerated even if the microcontroller is powered on again.

Next, when the microcontroller starts to write data, the processing circuit (e.g., the processing circuit 110) will access the primitive data (Step S130) and send it to the data scrambling circuit, so that the data scrambling circuit can exchange addresses of the data units in the primitive data based on the transformation matrix (Step S140) and generate scrambled data (Step S150).

The scrambled data will be sent to the nonvolatile memory after being generated, and the microcontroller will determine whether the writing operation has been completed (Step S160). If not, the flow returns to Step S130 to go on accessing the next primitive data, and perform subsequent steps S140 and S150 to generate scrambled data, and then execute Step S160 to repeatedly determine whether the writing operation is completed. Until it is determined that the write operation is completed, the flow ends.

In order to more detailed explain the step flow of FIG. 5A, an example is further illustrated as follows with reference to FIG. 6A, which is a diagram illustrating a transmission data encryption method of a microcontroller according to an embodiment of the present disclosure.

Figure 6A:
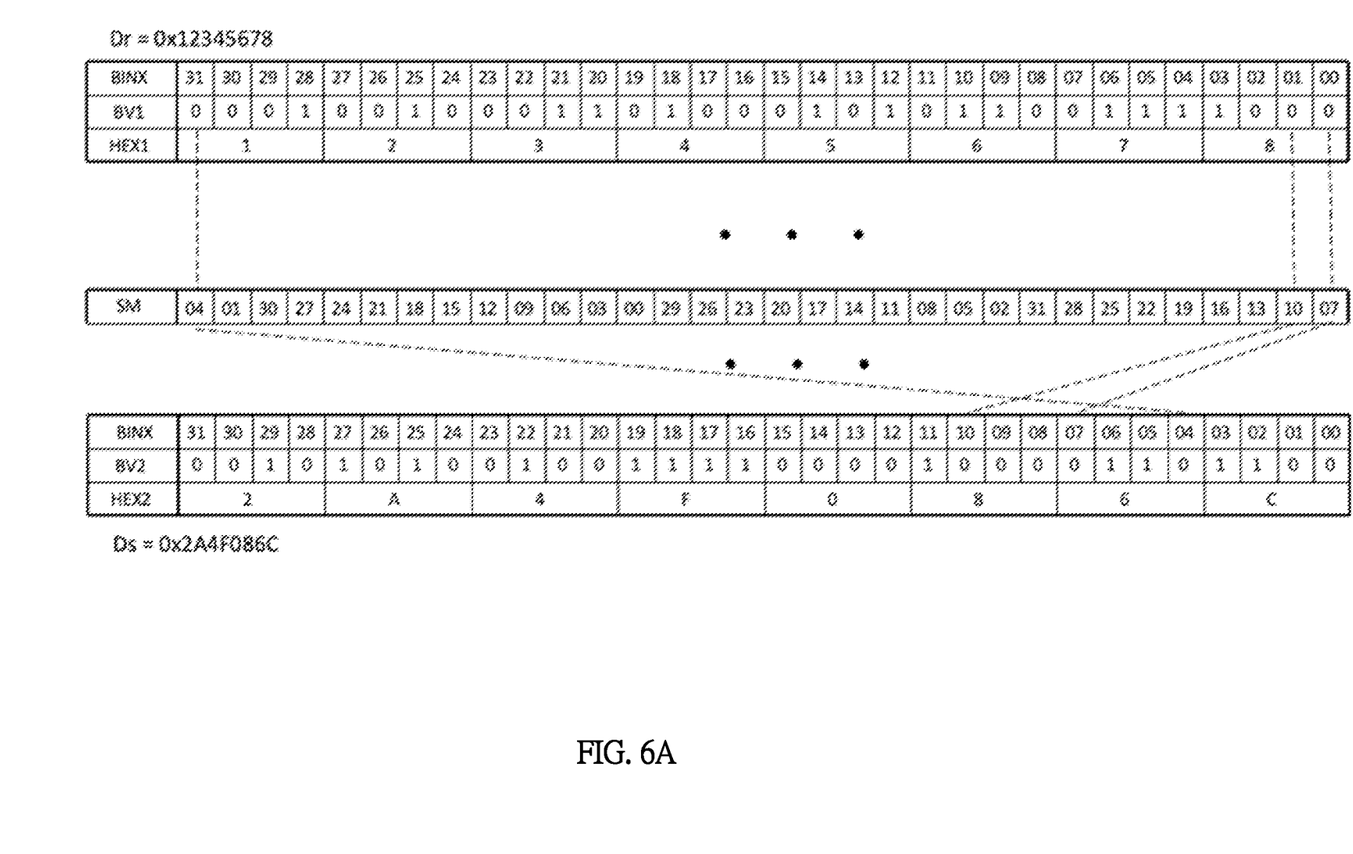
FIGS. 6A and 6B are diagrams illustrating the transmission data encryption methods of microcontrollers according to different embodiments of the present disclosure.

Please refer to FIG. 5A and FIG. 6A. In this embodiment, the primitive data Dr is exemplarily given as the 32-bit data HEX1 with the value 0x12345678 as an example, where each bit value BV1 and its corresponding Address BINX in the primitive data Dr are shown in FIG. 6A. In Step S110, the characteristic parameter CP obtained by the data scrambling circuit may be 7, and the random-number value TRNG may be 3.

In Step S120, the data scrambling circuit can generate the transformation matrix SM according to the following equation:

$$SM(ax)_{x=0\sim31} = (BINX * (TRNG) + CP)\% 32 \quad (1)$$

where ax denotes an element in the transformation matrix SM, the sequential order of "a0, a1, . . . , a31" is based on the order of Address BINX, and "%32" is to calculate the remainder after being divided by 32.

According to the above equation (1), the value of each element a0, a1, . . . , a31 in the transformation matrix SM can be calculated as follows:

$$a0 = (0^*3 + 7)\% 32 = 7;$$

$$a1 = (1^*3 + 7)\% 32 = 10;$$

$$a2 = (2^*3 + 7)\% 32 = 13;$$

As other elements can be calculated using the same ideology, the details thereof are omitted here for brevity.

Therefore, according to the above equations, the values of each element a0, a1, . . . , a31 can be calculated, to further obtain the transformation matrix SM=(4, 1, 30, . . . , 7).

Next, in Step S140, the data scrambling circuit sequentially allocates the values of bits 0-31 of the primitive data Dr to the addresses specified by the transformation matrix SM. For example, the value 0 at bit 0 will be allocated to bit 7 specified by the element a0, the value 0 at bit 1 will be allocated to bit 7 specified by element a1, and so on.

Therefore, the address-exchanged bit value BV2 will constitute the data HEX2 with the value 0x2A4F086C, to serve as the scrambled data Ds.

Please refer to FIG. 5B. When the microcontroller reads data from the outside, the microcontroller receives the external data through the transmission interface circuit (e.g., the transmission interface circuit 140) (Step S210), and then sends it to the data scrambling circuit. After reading the transformation matrix (Step S220), the data scrambling circuit performs reverse address exchanging upon data units in external data based on the transformation matrix (Step S230) and generates primitive data (Step S240).

After being generated, the raw data will be sent to the processing circuit and/or the storage circuit, and the microcontroller will determine whether the reading operation has been completed (Step S250). If not, the flow goes back to Step S210 to go on reading the next external data, and perform subsequent steps S230 and S240 to restore the primitive data. Next, Step S250 is executed to repeatedly determine whether the reading operation is completed. When it is determined that the reading operation is completed, the flow ends.

Figure 6B:
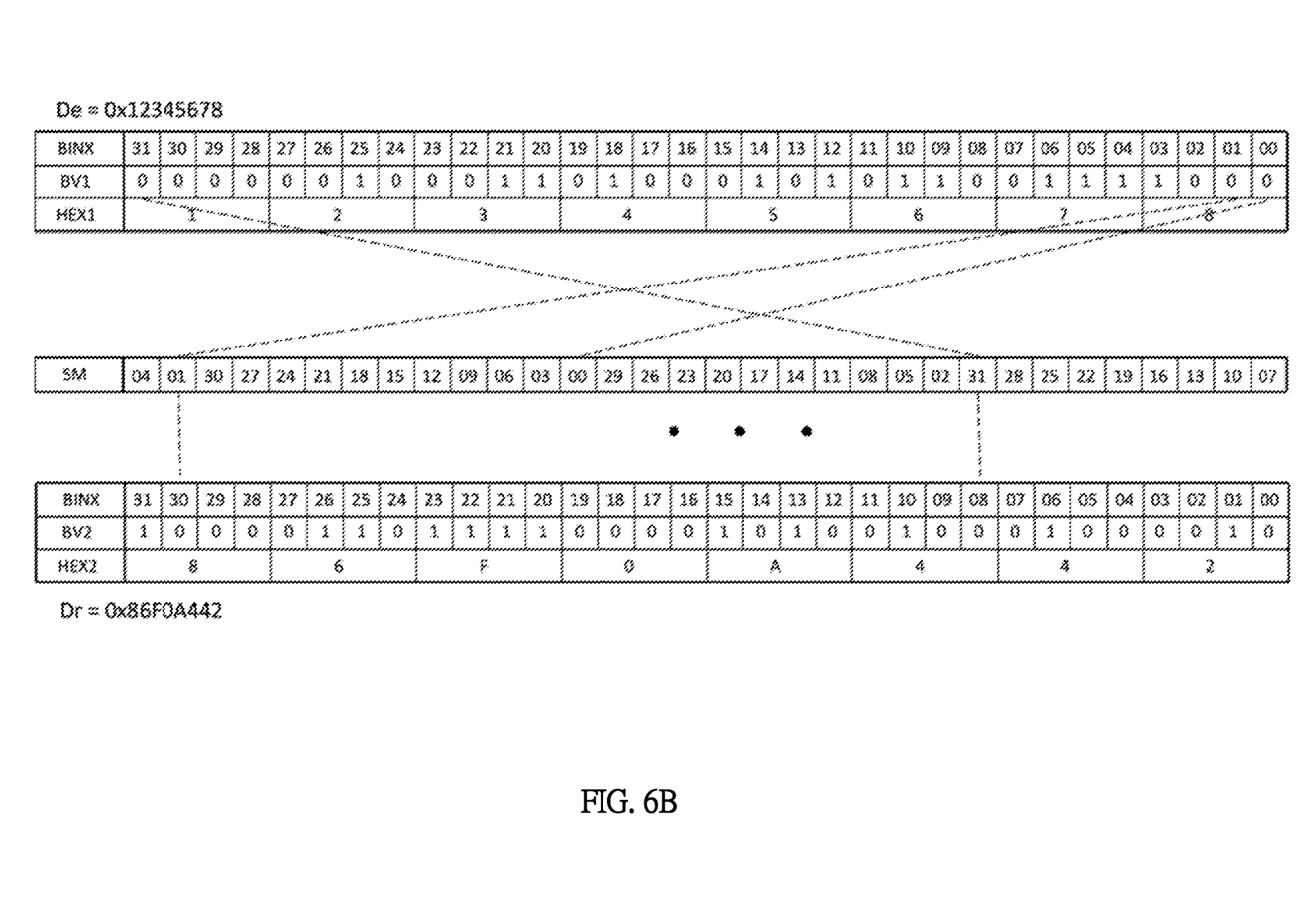

In order to more detailed explain the flow of FIG. 5B, an example is further illustrated as follows with FIG. 6B, wherein FIG. 6B is a diagram illustrating a transmission data encryption method of a microcontroller according to another embodiment of the present disclosure.

Please refer to FIG. 5B and FIG. 6B. In this embodiment, the external data De is exemplarily given as a 32-bit data HEX1 with the value 0x12345678, while the transformation matrix SM of this embodiment is the same as that of the embodiment shown in FIG. 6A.

In Step S230, the data scrambling circuit sequentially allocates the bit values BV1 of bits 0 to 31 of the external data De to the addresses with the same element values in the transformation matrix SM. For example, a value of 0 in bit 0 will be allocated to Address 19 corresponding to element a19(00), a value of 0 in bit 1 will be allocated to Address 30 corresponding to element a30(01), and so on. Therefore, after reverse address exchanging is performed, the bit value BV2 will constitute the data HEX2 with the value 0x86F0A442 as the primitive data Dr.

The characteristic parameters CP, the random-number value TRNG and the equation (1) for generating the transformation matrix illustrated in the above-mentioned FIGS. 6A and 6B are only for illustrative purposes. Any method of generating the transformation matrix by obtaining the characteristic parameters of the dedicated microcontroller and scrambling the pattern of the primitive data to be sent to the outside of the microcontroller through the transformation matrix shall fall within the scope of the present disclosure, and the present disclosure is not limited thereto.

It should be noted that in the embodiments of FIGS. 5B and 6B that the microcontroller reads data from the outside, the external data De can also be regarded as the scrambled data Ds under the system architecture of the embodiment of the present application.

To sum up, the microcontroller, the electronic device and the transmission data encryption method using the microcontroller disclosed in this disclosure can generate a transformation matrix by using the dedicated parameter information of individual microcontrollers to encrypt the primitive data, so that even if the data sent by the microcontroller to the outside is intercepted, the firmware information of the microcontroller cannot be obtained, thereby reducing the possibility that others steal the firmware information by monitoring the bus signal or forcibly removing the nonvolatile memory and then using a specific reading device. In addition, because the transformation matrix is generated based on the dedicated characteristic parameters of the microcontroller, each microcontroller will have its own dedicated transformation matrix. In this way, even if the transformation matrix of a single microcontroller is cracked, the cracked information cannot be easily leaked nor applied to other microcontroller products. Compared with conventional methods of which the information protection ability is nullified once the data encryption algorithm is cracked, the present invention can provide better information security.

What is claimed is:

1. A microcontroller comprising: a processing circuit arranged to access a primitive data to control operations of the microcontroller; a storage circuit coupled to the processing circuit, and arranged to store a characteristic parameter of the microcontroller; and a data scrambling circuit coupled to the storage circuit and the processing circuit, and arranged to generate a transformation matrix according to at least one of the characteristic parameters and a random-number value, wherein when the microcontroller sends data, the data scrambling circuit performs address exchanging upon a plurality of data units in the primitive data based on the transformation matrix, to generate a scrambled data, and wherein the plurality of data units in the primitive data respectively correspond to a plurality of elements of the transformation matrix, and when address exchanging is performed by the data scrambling circuit, the data scrambling circuit allocates a designated address to each data unit according to its corresponding element to generate the scrambled data.

2. The microcontroller according to claim 1, wherein when the microcontroller receives an external data, the data scrambling circuit performs reverse address exchanging upon a plurality of data units in the external data based on the transformation matrix, to convert the external data into the primitive data.

3. The microcontroller according to claim 2, wherein the plurality of data units in the primitive data respectively correspond to the plurality of elements of the transformation matrix, and when the data scrambling circuit performs reverse address exchanging, the data scrambling circuit allocates the plurality of data units in the external data with addresses corresponding to elements in an order of address, to generate the primitive data.

4. The microcontroller of claim 1, wherein the data scrambling circuit comprises: a random-number generator arranged to generate a random-number value; a transformation matrix generating unit coupled to the random-number generator, and arranged to generate the transformation matrix according to the random-number value and the characteristic parameter, wherein a number of elements of the transformation matrix is corresponding to a number of the plurality of data units; and a data conversion unit coupled to the transformation matrix generation unit, and arranged to perform address exchanging upon the primitive data according to the transformation matrix, to generate the scrambled data.

5. The microcontroller of claim 4, wherein the random-number generator comprises: an oscillation circuit arranged to generate a clock signal; a random sampling circuit electrically connected to the oscillation circuit, and arranged to randomly sample the clock signal to generate a random sampling signal; and a register electrically connected to the random sampling circuit, and arranged to store the random sampling signal as the random-number value.

6. An electronic device comprising: a non-volatile memory; and a microcontroller electrically connected to the nonvolatile memory, and arranged to write a scrambled data into or reading the scrambled data from the nonvolatile memory; the microcontroller comprising: a processing circuit arranged to access a primitive data to control operations of the microcontroller; a storage circuit coupled to the processing circuit, and arranged to store a characteristic parameter of the microcontroller; and a data scrambling circuit coupled to the storage circuit and the processing circuit, and arranged to generate a transformation matrix according to at least one of the characteristic parameter and a random-number value, wherein when the microcontroller sends data, the data scrambling circuit performs address exchanging upon a plurality of data units in the primitive data based on the transformation matrix, to generate a scrambled data, wherein the plurality of data units in the primitive data respectively correspond to a plurality of elements of the transformation matrix, and when the address exchanging is performed by the data scrambling circuit, the data scrambling circuit allocates a designated address to each data unit according to its corresponding element to generate the scrambled data; and when the microcontroller receives the scrambled data from the nonvolatile memory, the data scrambling circuit performs reverse address exchanging upon a plurality of data units in the scrambled data based on the transformation matrix, to convert the scrambled data into the primitive data.

7. The electronic device according to claim 6, wherein when the microcontroller receives an external data, the data scrambling circuit performs reverse address exchanging upon a plurality of data units in the external data based on the transformation matrix, to convert the external data into the primitive data.

8. The electronic device according to claim 7, wherein the plurality of data units in the primitive data respectively correspond to the plurality of elements of the transformation matrix, and when the data scrambling circuit performs reverse address exchanging, the data scrambling circuit allocates the plurality of data units in the external data with addresses corresponding to elements in an order of address, to generate the primitive data.

9. The electronic device according to claim 6, wherein the data scrambling circuit comprises: a random-number generator arranged to generate the random-number value; a transformation matrix generating unit coupled to the random-number generator, and arranged to generate the transformation matrix according to the random-number value and the characteristic parameter, wherein a number of the plurality of elements of the transformation matrix is corresponding to a number of the plurality of data units; and a data conversion unit, coupled to the transformation matrix generation unit, and arranged to perform address exchanging upon the primitive data according to the transformation matrix to generate the scrambled data.

10. The electronic device of claim 9, wherein the random-number generator comprises: an oscillation circuit arranged to generate a clock signal; a random sampling circuit electrically connected to the oscillation circuit, and arranged to randomly sample the clock signal to generate a random sampling signal; and a register electrically connected to the random sampling circuit, and arranged to store the random sampling signal as the random-number value.

11. The electronic device according to claim 9, wherein the oscillation circuit comprises a high-frequency oscillation unit for generating a high-frequency oscillation signal and a low-frequency oscillation unit for generating a low-frequency oscillation signal; wherein the clock signal comprises the high-frequency oscillation signal and the low-frequency oscillation signal.

12. A transmission data encryption method for a microcontroller, comprising: generating a transformation matrix according to a characteristic parameter and a random-number value of the microcontroller; when sending data, the microcontroller performing address exchanging upon a plurality of data units in a primitive data based on the transformation matrix, to generate and send a scrambled data, wherein the step of generating the transformation matrix according to the characteristic parameter and the random-number value of the microcontroller comprises: generating a plurality of elements of the transformation matrix according to a unique identification code (UID) of the microcontroller and the random-number value, wherein the plurality of elements correspond to a plurality of data units, wherein the step of performing the address exchanging upon the plurality of data units in the primitive data based on the transformation matrix to generate and send the scrambled data comprises: allocating a designated address to each data unit according to its corresponding element to generate the scrambled data,; and when receiving external data, the microcontroller performing reverse address exchanging upon a plurality of data units in the received external data based on the transformation matrix, to convert the external data into the primitive data.

13. The transmission data encryption method for the microcontroller according to claim 12, wherein the step of performing reverse address exchanging upon the plurality of data units in the received external data based on the transformation matrix to convert the external data into the primitive data comprises: allocating data units in the external data with addresses corresponding to the elements according to an order of the elements to generate the primitive data.

* * * * *